United States Patent
Iannuzzi et al.

(10) Patent No.: US 7,916,306 B2
(45) Date of Patent: Mar. 29, 2011

(54) OPTICAL DEVICE COMPRISING A CANTILEVER AND METHOD OF FABRICATION AND USE THEREOF

(75) Inventors: Davide Iannuzzi, Hilversum (NL);
Szablocs Deladi, Enschede (NL);
Michael Curt Elwenspoek, Borne (NL)

(73) Assignees: Vereniging Voor Christelijk Hoger Onderwijs Wetenschappelijk Onderzoek En Patientenzorg, Amsterdam (NL); Universiteit Twente, Enschede (NL)

( * ) Notice: Subject to any disclaimer, the term of this patent is extended or adjusted under 35 U.S.C. 154(b) by 307 days.

(21) Appl. No.: 12/094,352

(22) PCT Filed: Nov. 28, 2005

(86) PCT No.: PCT/NL2005/000816
§ 371 (c)(1),
(2), (4) Date: Sep. 4, 2008

(87) PCT Pub. No.: WO2007/061286
PCT Pub. Date: May 31, 2007

(65) Prior Publication Data
US 2009/0002714 A1   Jan. 1, 2009

(51) Int. Cl.
*G01B 11/02* (2006.01)
*G01B 9/02* (2006.01)
(52) U.S. Cl. ........................ 356/501; 356/477
(58) Field of Classification Search .................. 356/501, 356/450, 477
See application file for complete search history.

(56) References Cited

U.S. PATENT DOCUMENTS

| 5,017,010 A | * | 5/1991 | Mamin et al. .................. 356/482 |
| 5,289,004 A |   | 2/1994 | Okada et al. |
| 5,420,688 A | * | 5/1995 | Farah ............................ 356/477 |
| 5,891,747 A | * | 4/1999 | Farah ............................... 438/31 |
| 7,060,448 B2 | * | 6/2006 | Henderson et al. ............. 435/7.1 |

FOREIGN PATENT DOCUMENTS

| DE | 103 42 331 A1 | 5/2005 |
| EP | 0 398 085 A1 | 11/1990 |
| JP | 11108640 A  * | 4/1999 |

OTHER PUBLICATIONS

Grosch, G., "Hybrid Fiber-optic/Micromechanical Frequency Encoding Displacement Sensor", Sensors and Actuators—A Physical, Elsevier Sequoia, vol. A23, No. 1/3, 1128-1131, (Apr. 1990).

(Continued)

*Primary Examiner* — Michael A Lyons
(74) *Attorney, Agent, or Firm* — Hoffmann & Baron, LLP (57) ABSTRACT

The present invention provides an optical device, comprising an optical fiber and a cantilever that is arranged on an end of the optical fiber; The cantilever may be an integral part of the optical fiber, and may have a length that is substantially equal to a diameter of the optical fiber. Measurement means for measuring a displacement of the cantilever are connected to an opposite end of the, optical fiber. A method of measuring a displacement using the optical device comprises the steps of: —arranging measurement means, comprising a light source, on an opposite end of the optical fiber; —using the light source to send a beam of light into the optical fiber; —measuring the interference of light that is reflected on the end op the optical fiber and light that is reflected on the cantilever; and determining the displacement of the cantilever relative to an intermediate position dependent on the measured interference.

22 Claims, 6 Drawing Sheets

OTHER PUBLICATIONS

Iannuzzi, D., et al., "Monolithic Fiber-top Sensor for Critical Environments and Standard Applications", Applied Physics Letters, vol. 88, No. 5, 053501-1-3, (2006).

Kato, N., et al., "Force-balancing Microforce Sensor with an Optical-fiber Interferometer", Rev. Sci. Instrum., vol. 68, No. 6, 2475-2478, (Jun. 1997).

Siebel, E.M., "A Scanning Force Microscope for in situ Observation of Electrochemical Processes", Applied Physics A, Materials Science & Processing, vol. 66, S83-S86, (1998).

Yakimov, V., et al., "Electrostatic Force-feedback Force Sensor Incorporated in an Ultrahigh Vacuum Force Microscope", Review of Scientific Instruments, vol. 71, No. 1, 133-136, (Jan. 2000).

* cited by examiner

Fig 9

OPTICAL DEVICE COMPRISING A CANTILEVER AND METHOD OF FABRICATION AND USE THEREOF

CROSS-REFERENCE TO RELATED APPLICATIONS

This application is the National Stage of International Application No. PCT/NL2005/000816, filed Nov. 28, 2005, the contents of which is incorporated by reference herein.

FIELD OF THE INVENTION

The present invention relates to an optical device comprising a cantilever, to a method a fabrication thereof and to a method of measuring a displacement of a cantilever.

BACKGROUND OF THE INVENTION

Micromachined cantilevers are the most elementary and successful example of miniaturized sensors. A cantilever, comprising a free-standing beam can often detect changes in the chemical, biological and/or physical properties of the surroundings with sensitivity comparable, if not superior, to much more complicated devices. It is thus not surprising that this simple design is still at the heart of several commercially available instruments, including, but not limited to, an Atomic Force Microscope (AFM). A description of the AFM can be found in G. Binnig, C. F. Quate, Ch. Gerber, *Phys. Rev. Lett.* 56, 930 (1986), which is included herein by reference.

These instruments rely on the possibility to measure a displacement of the suspended part of the beam perpendicular to its length with up to atomic accuracy, a level of precision that can for instance be achieved by electronic or optical read-out. Methods of measuring the displacement of the suspended part include for instance tunneling probes (G. Binnig, C. F. Quate, Ch. Gerber, *Phys. Rev. Lett.* 56, 930 (1986)), integrated field-effect transistors (R. G. Beck, et al., *Appl. Phys. Lett.* 73, 1149 (1998)), capacitive methods (J. Brugger, N. Blanc, Ph. Renaud, N. F. de Rooij, *Sens. Actuators*, A43, 339 (1994)), piezoelectric or piezoresistive devices (J. Tansock, C. C. Williams, *Ultramicroscopy* 42-44, 1464 (1992)), optical levers (M. Tortonese, R. C. Barrett, C. F. Quate, *Appl. Phys. Lett.* 62, 834 (1992), or G. Meyer, N. M. Amer, *Appl. Phys. Lett.* 53, 1045 (1988)), or optical fiber interferometers (S. Alexander, et al., *J. Appl. Phys.* 65, 164 (1989), D. Rugar, H. J. Mamin, R. Erlandsson, B. D. Terris, *Rev. Sci. Instr.,* 59, 2337 (1988) or A. D. Drake, D. C. Leiner, *Rev. Sci. Instr.* 55, 162 (1984)).

Electronic read-outs may be incompatible with the environment where measurements must be performed. Examples of such environments are electrically conductive liquids or extreme temperatures. Furthermore, fabrication of the measurement devices involves cumbersome and expensive processes, an important detail that has limited their commercial and scientific impact. Optical techniques are more widespread than electronic techniques, as their application faces fewer limitations. However, optical techniques generally require an inconvenient, time consuming alignment procedure, which represents a major technical challenge for applications beyond standard experiments.

SUMMARY OF THE INVENTION

The present invention aims to provide an improved device, to render application thereof more convenient.

According to a first aspect, this aim is achieved by an optical device, comprising:
an optical fiber;
a cantilever that is arranged on an end of the optical fiber.

The present device is for instance suitable for AFM measurements in critical environments and for any other application where a cantilever may be used. The cantilever is correctly aligned relative to the optical fiber by incorporating the cantilever in an end of the optical fiber. The displacement sensitivity of such an arrangement proves to be comparable to commercially available AFMs. Thus, fiber-top cantilevers can be successfully used not only in critical environments, but also in standard experiments.

In an embodiment, the cantilever is an integral part of the optical fiber. Because of this monolithic structure, the device does not require any alignment procedure, not even in case of relatively large temperature fluctuations, and corresponding expansion or shrinkage, during use.

In an embodiment the cantilever has a length that is substantially equal to a diameter of the optical fiber. Rendering the length of the cantilever in the order of the diameter of the optical fiber improves the sensitivity of the device. Substantially equal may be regarded as the diameter+/−10%.

Measurement means for measuring a displacement of the cantilever may be connected to an opposite end of the optical fiber. The measurement means may comprise a laser. The laser may be arranged for directing light into the optical fiber.

Optionally, the cantilever has two opposite ends, wherein one end is anchored to the optical fiber and the opposite end is free-ranging.

Other embodiments comprise cantilevers having a different geometry. The cantilever may comprise a beam having a widened plate in the middle. In an embodiment, the two opposite ends of the cantilever are both fixed to the optical fiber, and a part of the cantilever between the two ends is freely suspended over the optical fiber. This embodiment is referred to as a bridge configuration.

Optionally, the measurement means include a high frequency filter to reduce the noise level and to improve the sensitivity. The sensitivity of the device may be below 4 Å. In an improved embodiment, the sensitivity of the device is superior to atomic level, for instance in the order of 0.4 to 0.2 Å.

Preferably, the cantilever comprises glass and/or silica. I.e., the cantilever may be fabricated from the same material as a light-conducting core of the optical fiber. This cantilever comprises fewer components. The accuracy can be comparable to commercially available AFMs.

In a further embodiment the cantilever and/or the a part of the end of the optical fiber may be coated with a reflection layer. The reflection layer optionally comprises a metal such as silver, gold or platinum. Adding the reflection layer increases measurement performance. A thickness of the metallic reflection layer may be in the order of 100 nm. The reflection layer improves the reflection of light, and thus improves the sensitivity when the device is used as an interferometer.

According to a second aspect, the present invention provides a method of fabricating an optical device, comprising the steps of:
providing an optical fiber;
arranging a cantilever on an end of the optical fiber.

In an embodiment, arranging a cantilever on an end of the optical fiber comprises the further steps of:
coating the optical fiber with a metallic layer to prevent electrostatic charge accumulation; and machining the end of the optical fiber to obtain the cantilever as an integral part of the optical fiber.

In an embodiment, the step of machining the end of the optical fiber is followed by the step of depositing a reflection layer on a part of the end of the optical fiber and/or on the cantilever.

According to a third aspect, a method of measuring a displacement using the optical device as described above is provided, the method comprising the steps of:

arranging measurement means, comprising a light source, on an opposite end of the optical fiber;

using the light source to send a beam of light into the optical fiber;

measuring the interference of light that is reflected on the end of the optical fiber and light that is reflected on the cantilever;

determining the position of the cantilever relative to the optical fiber dependent on the measured interference.

BRIEF DESCRIPTION OF THE DRAWINGS

Further advantages and details will become apparent in the light of the following drawings, wherein:

FIGS. 9-20 show diagrams of subsequent steps of an alternative method for producing an optical device according to the present invention;

DETAILED DESCRIPTION OF PREFERRED EMBODIMENTS

Figure 1:
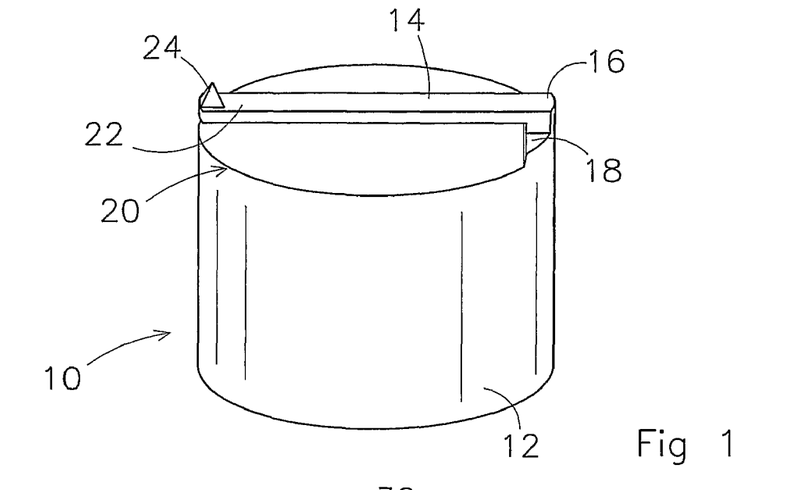
FIG. 1 shows a perspective view of a first embodiment of the optical device according to the present invention.

FIG. 1 shows a first embodiment of an optical device 10 according to the present invention. The device comprises an optical fiber 12. The optical fiber comprises a translucent, elongated tubular body comprising silica. The tubular body has two opposite ends that are suitable for inputting and/or outputting light. Furthermore, the tubular body is flexible and solid, and is able to guide light signals. Commercially available optical fibers comprise such a translucent core of silica, surrounded by a translucent cladding made out of, for instance, doped silica, and an insulating jacket (not shown in FIG. 1). The jacket commonly comprises a synthetic material.

A cantilever 14 is arranged on the fiber 12. The cantilever comprises an elongated body having two opposite ends. One of the two opposite ends or both ends are connected to the optical fiber. A part of the body of the cantilever between the two ends is freely suspended over the optical fiber. This part has a flexibility that allows movement of the part in the length direction of the tubular body of the fiber. Exemplary embodiments of the cantilever are described below.

In the embodiment of FIG. 1, the cantilever is an integral part of the optical fiber. A first end 16 of the cantilever is connected to an elevation 18 of an end 20 of the optical fiber. The elevation comprises a ridge that extends from the optical fiber. One side of the ridge coincides with a wall of the tubular body of the fiber. An opposite, free end 22 of the cantilever is suspended over the end 20 of the fiber. The ridge creates a space between the end 20 of the fiber and the cantilever, to allow movement of the cantilever in the length direction of the tubular body of the fiber. Optionally, the end 22 is provided with an extending tip 24, for instance for application in an AFM. The cantilever may be connected on the optical fiber by other means, i.e. form a separate part.

Examples of an alternative geometry are shown in, but not limited to, FIGS. 2A to 7. Elements that correspond with the embodiment of FIG. 1 have the same reference numerals as shown in FIG. 1.

Figure 2A:
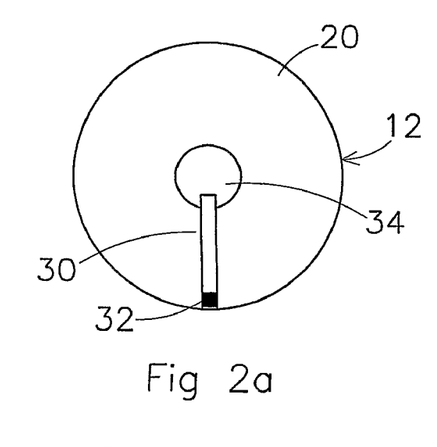
FIGS. 2A, 3A, 4-7 show diagrams of further embodiments of the optical device according to the present invention.

FIG. 2A shows a cantilever 30 comprising a beam having an end 32 that is fixed to end 20 of the optical fiber. At an opposite end the beam is connected to a round plate 34. The round plate is substantially suspended over the center of optical fiber 12. The increased surface of the plate relative to the beam near the center of the optical fiber improves the reflective properties of the cantilever.

Figure 2B:
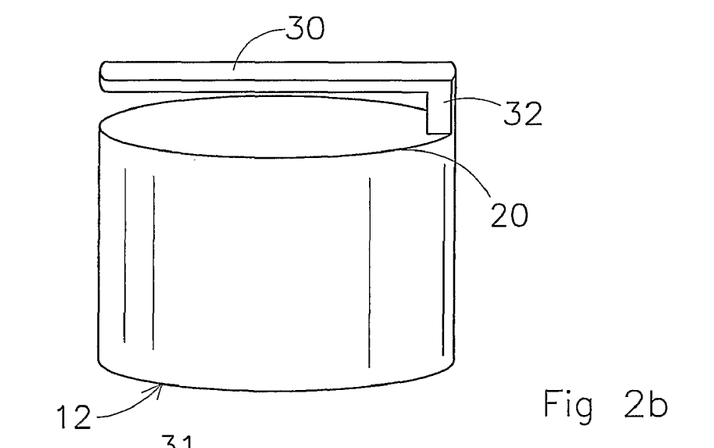
FIGS. 2B, 2C show perspective views of exemplary embodiments comprising a cantilever having a fixed end and a free-hanging end.

FIG. 2B shows an embodiment comprising, like the embodiment of FIGS. 1 and 2A, a cantilever having a fixed end 32 that is fixed to the optical fiber 12. The opposite end of the cantilever is free-hanging above the end 20 of the optical fiber.

Figure 2C:
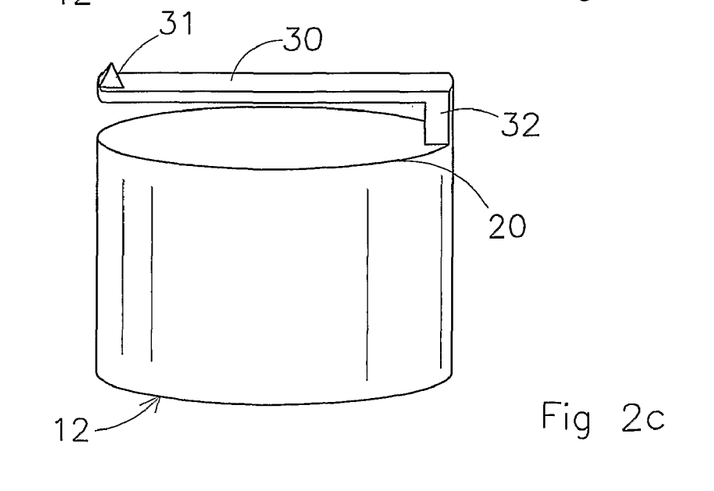

FIG. 2C shows an embodiment wherein a tip 31 is arranged at the free-hanging end of the cantilever 30. The way of fabricating the tip 31 is described below. The tip 31 is preferably pointed, and may comprise a single atom at the end that is facing away from the cantilever. This is for instance preferred for use of the device in an AFM. Forces between the tip and a sample provide an indication of a surface geometry of the sample.

Figure 3A:
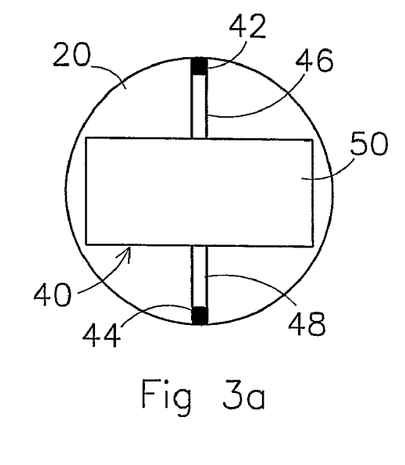

FIG. 3A shows an embodiment wherein an elongated cantilever 40 comprises two opposite ends 42, 44 that are fixed to the end 20 of the optical fiber 12. Two arms 46, 48 connect the fixed ends to a rectangular plate 50. The plate is suspended over the center of the end 20 of the optical fiber. The embodiment of the cantilever shown in FIG. 3A, comprising two opposite fixed ends and an intermediate freely suspended part, is referred to as a bridge configuration.

Figure 3B:
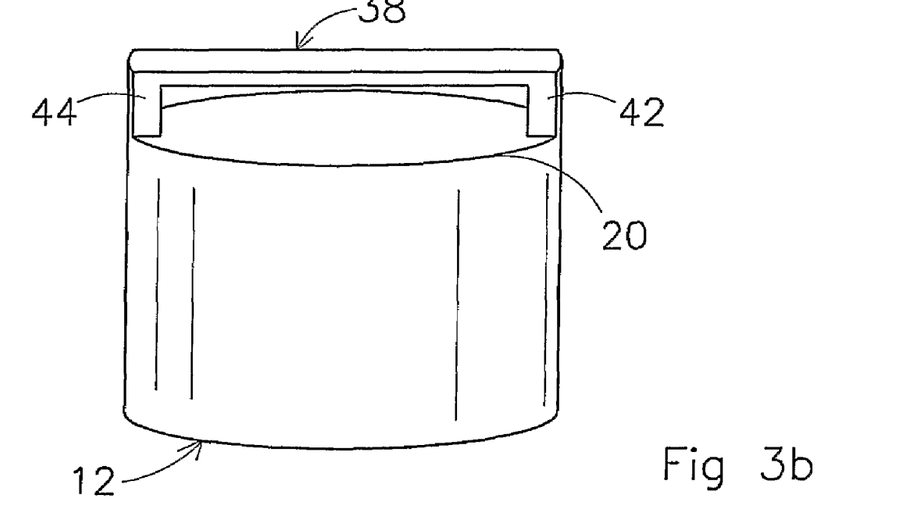
FIGS. 3B, 3C show perspective views of exemplary embodiments comprising a cantilever having a bridge configuration wherein two ends of the cantilever are fixed to the optical fiber.

FIG. 3B shows a simpler-embodiment of the bridge configuration. A cantilever 38 if fixed to the optical fiber 12 at two opposite ends 42, 44. The cantilever 38 further includes a beam that connects the two ends 42, 44. To provide the beam with a suitable flexibility, the choice of material or the dimensions of the beam, i.e. the thickness and/or the width, may be varied.

Figure 3C:
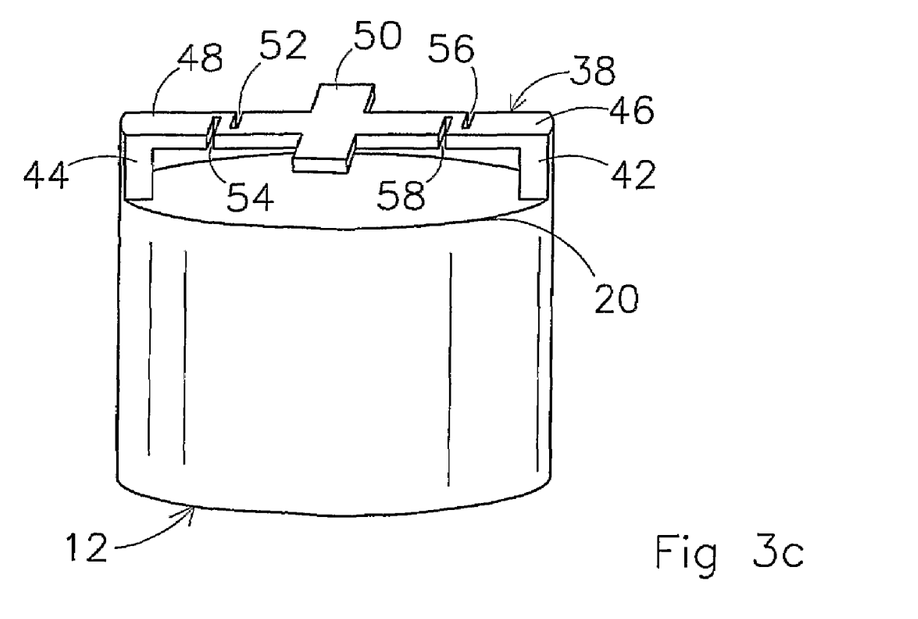

FIG. 3C shows another example of the bridge configuration. The cantilever 38 is at two ends 42, 44 fixed on the end 20 of the optical fiber 12. The cantilever comprises two beams 46, 48 connecting the ends 42, 44 with a central table or plate 50. To increase the flexibility of the cantilever, beams 46, 48 are provided with at least one indentation, for instance four indentations 52, 54, 56, 58.

Figure 4:
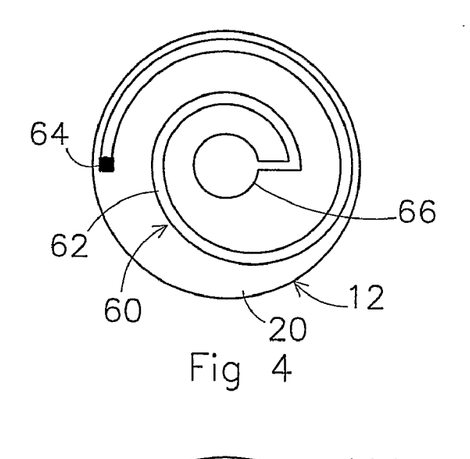

FIG. 4 shows an embodiment, wherein a cantilever 60 comprises a spiral-shaped arm 62. The arm 62 is on one end 64, which is located adjacent to the wall of the tubular body of the optical fiber, fixed to the end 20 of the optical fiber. On the opposite end, the arm comprises a round plate 66. The spiral arm increases the length and the flexibility of the cantilever, relative to the embodiment of FIG. 2A. The increased length and flexibility decreases the force that is needed to dislocate the free end of the cantilever, and increases the sensitivity of the optical device.

Figure 5:
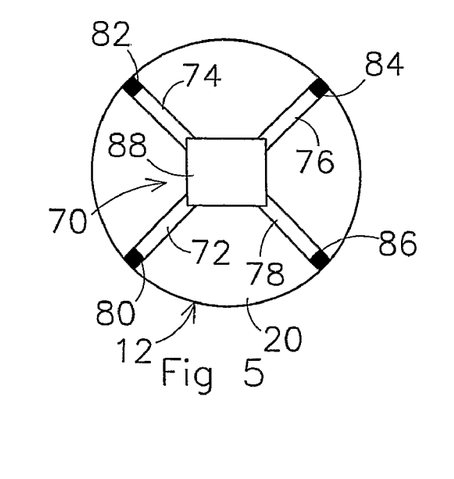

FIG. 5 shows a cross-shaped cantilever 70 having four crosswise extending arms 72, 74, 76, 78. The arms are on one end 80, 82, 84, 86 fixed, adjacent to the edge of the end 20. In the middle of the end 20, the arms converge into rectangular plate 88. Due to the four-point fixation the cantilever of FIG. 5 has an improved stability and rigidity, rendering it suitable for heavy-duty applications wherein durability and life span are important.

Figure 6:
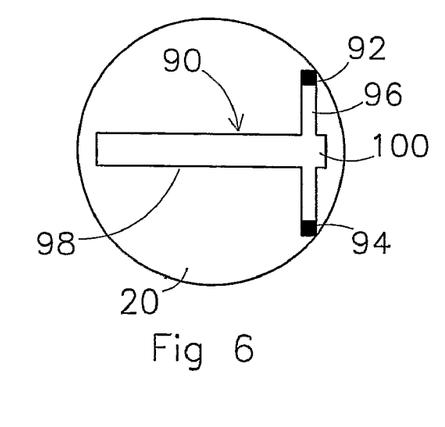

FIG. 6 shows a cantilever 90 comprising two ends 92, 94 that are fixed to the optical fiber 12 adjacent the edge of end 20. The ends 92, 94 are interconnected by a beam 96. In the middle of the beam 96, a perpendicularly extending second beam 98 is provided. The second beam 98 has a first end 100 that is arranged on the beam 96. The opposite freely suspended part of the beam 98 is moveable in the direction of the length of the optical fiber 12 by torsion of the beam 96. Application of movement of the cantilever is described below.

Figure 7:
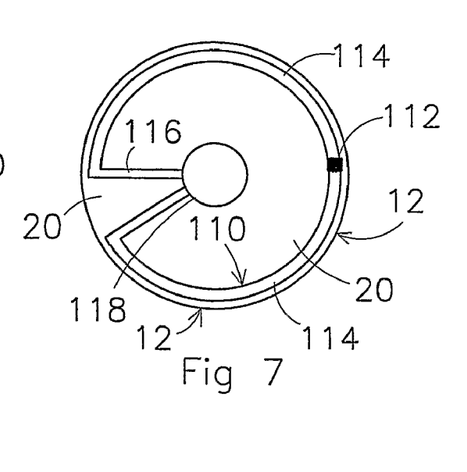

FIG. 7 shows a cantilever 110 having end 112 that is fixed to the optical fiber 12, adjacent the edge of end 20. From the fixed end 112, two semi-circular arms 114 extend to the opposite side of end 20 of the optical fiber. At the opposite end, the semi-circular arms extend into V-shaped arm 116 that is provided with a round plate 118.

Figure 8:
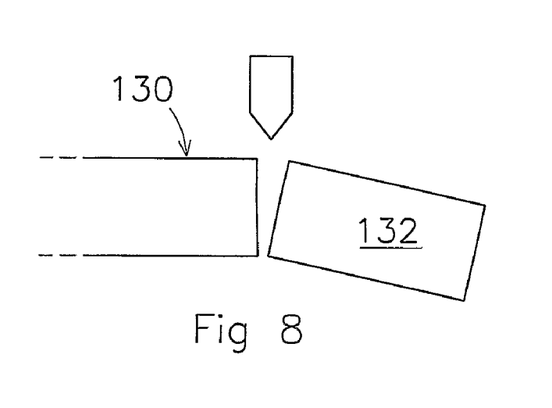
FIGS. 8-13 show diagrams of subsequent steps of a method for producing an optical device according to the present invention.
Figure 9:
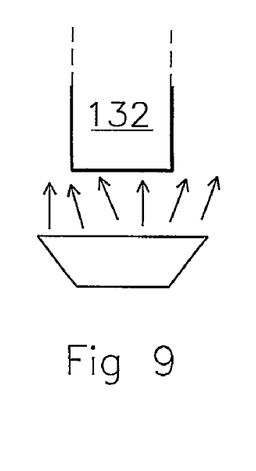
Figure 10:
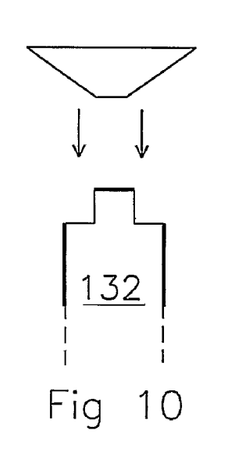
Figure 11:
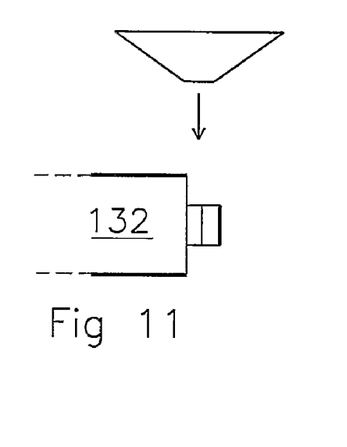
Figure 12:
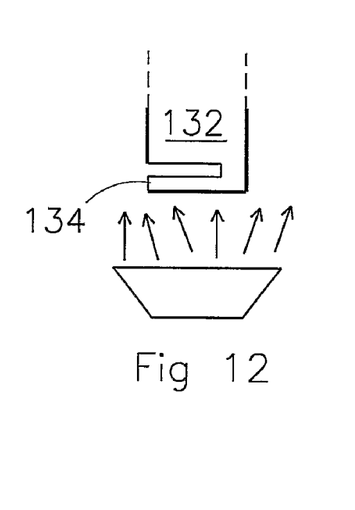
Figure 13:
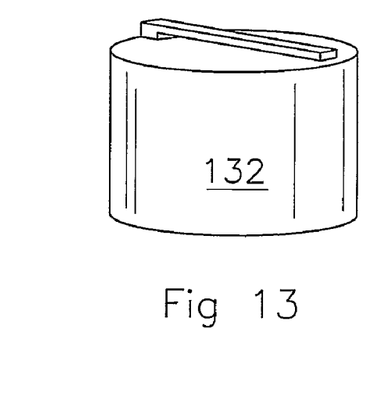
Figure 14:
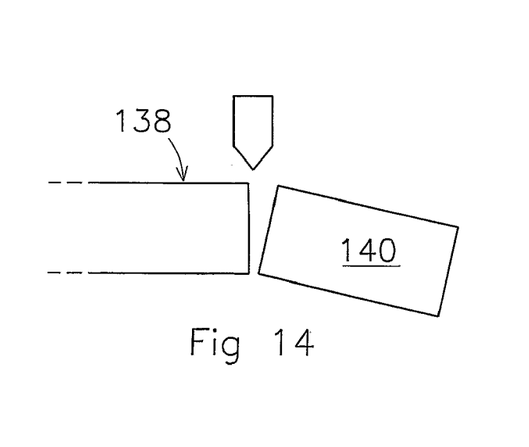
Figure 15:
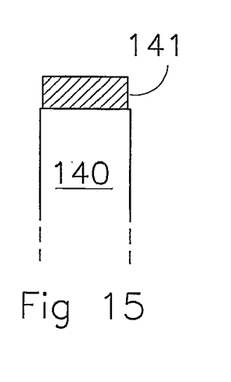
Figure 16:
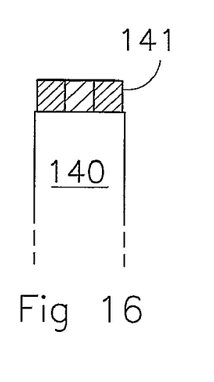
Figure 17:
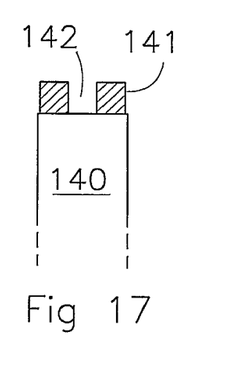
Figure 18:
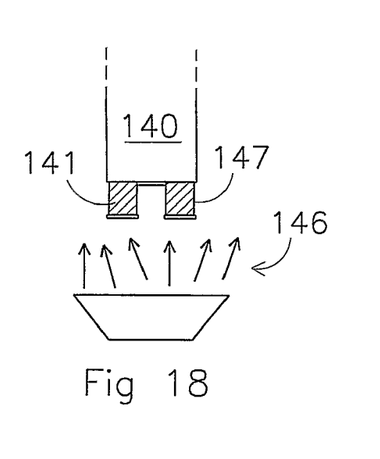
Figure 19:
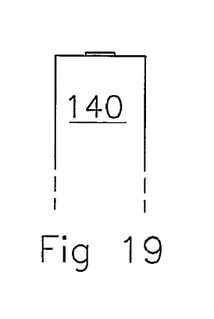

In a first exemplary method of fabrication, a single-mode optical fiber 130 (for instance commercially available SMF-28, corning: core diameter 9 μm, cladding diameter 125 μm) is cleaved to a desired length, using a known process (FIG. 8). The fiber is cleaved substantially perpendicular to its length direction. The desired length is for instance in the range of 1 to 5 m. The cleaved optical fiber 132 is stripped of its jacket (FIG. 9), and coated with a thin conductive layer (comprising metal, for instance 5 nm Cr and/or 20 nm Pd) to prevent electrostatic charge accumulation in the next fabrication step. The conductive coating is deposited on the end 20 of the fiber (FIG. 10) as well as on the longitudinal wall of the fiber, along the length thereof (FIG. 11). The coated end of the fiber is micromachined by means of Focused-Ion-Beam to obtain a cantilever 134 anchored to the fiber (FIG. 12). As described above, the cantilever may be parallel to the end of the fiber (FIG. 13). Subsequently, a reflection layer is deposited onto the cantilever, to improve reflection during interferometry. The reflection layer may comprise a metal. The thickness of the reflection layer may be in the order of 100 nm. The reflective layer may be of any reflective material available. Examples of suitable materials are silver, gold or platinum.

The above method of fabrication may be complemented by a step comprising the machining or deposition of a tip on the cantilever (see FIGS. 1 and 2C). The tip can be machined from the same material as the optical fiber. Machining the tip can for instance be done by carving the tip out of the cantilever. Arranging the tip may include evaporation or deposition of a suitable material, such as a metal, by other means. Also, growing the tip by a monolayer deposition technique is an option. The tip may be deposited before or after deposition of the reflection layer. Conventional AFMs use a cantilever having an extending tip at the end of the cantilever. Thus, the device according to the present invention is suitable for use in such AFM.

Other method steps may be used to machine the cantilever. Other methods include photolithography, e-beam lithography, wet or dry etching (maybe after implantation, annealing, lift-off, masking, deposition of metals or other coatings, et cetera), microtome cutting, laser ablation, diamond cutting, nano-imprinting et cetera.

Figure 20:
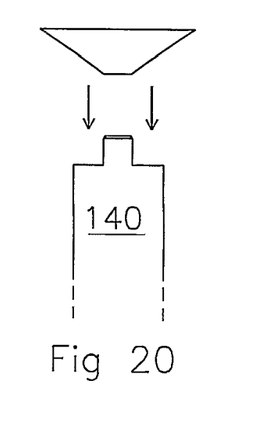

An example is shown in FIGS. 14 to 20. The steps are: —Cleaving the optical fiber 138 to a desired length (FIG. 14); —applying photo-resist 141, such as PolyMethyl MethAcrylate (PMMA), at an end of the cleaved optical fiber 140 (FIG. 15); —expose the photo-resist 141 with light or electrons to arrange a groove 142 (FIG. 16); —remove the exposed photo-resist (FIG. 17) to create the groove in end 144 of the translucent core of the cleaved optical fiber (FIG. 17); —deposit, e.g. by evaporating, a suitable material 146 on the photo-resist and in the groove (FIG. 18); —removing, i.e. so called lift-off, the photo-resist 141 that encloses the groove (FIG. 19); removing material of the optical fiber, e.g. by etching, to create the space between the cantilever and the optical fiber (FIG. 20).

The same device can be obtained by growing layers on top of the optical fiber and using conventional micromachining techniques. Materials to be grown can be distinguished in two main classes:

1) Sacrificial layers, i.e. layers that are used only for fabrication purposes and that are removed at the end of the fabrication process. Examples of sacrificial materials are silica, quartz, phosphosilicate glass, PolyMethyl MethAcrylate (PMMA), metals, et cetera; and 2) Mechanical or structural materials, i.e. materials that perform mechanical duties. Examples of mechanical materials are crystalline silicon, polycrystalline silicon, silicon nitride, silicon oxide, metallic layers, et cetera. The materials mentioned before are preferred due to their compatibility with the material of the optical fiber. Examples of microfabrication techniques have been listed above.

Figure 21:
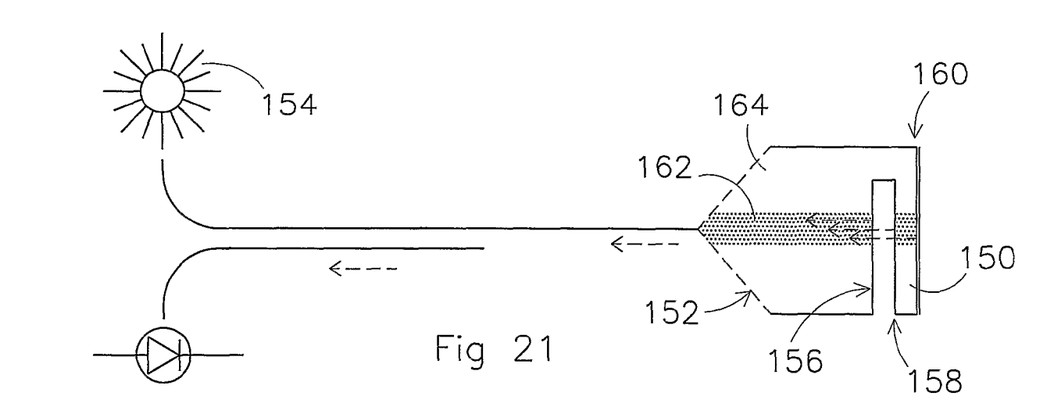
FIG. 21 shows a diagram of the use of an optical device according to the present invention for measuring a displacement of the cantilever.

FIG. 21 shows a diagram of an embodiment of an optical read-out technique. The technique is applicable to any embodiment of the FIGS. 1 tot 7. The displacement of the cantilever 150 relative to the length of the optical fiber 152 can be determined by measuring the interference of (laser) light reflected at the fiber-to-air interface and light that is reflected at the cantilever itself. In FIG. 21, continuous arrows represent the light input into the optical fiber by light source 154. Dashed arrows represent the light reflected at the fiber-to-air, air-to-cantilever and/or cantilever-to-reflective layer interfaces (156, 158 and 160 respectively). In the enlarged portion of the optical fiber on the right of FIG. 21, the dark area in the middle of the fiber represents the beam of laser light 162 travelling through the fiber (not to scale).

Figure 22:
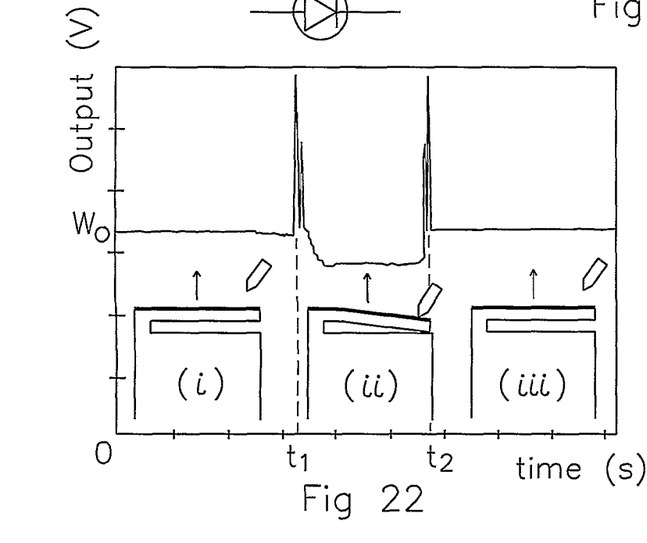
FIG. 22 shows an example of a read-out during the measurement of FIG. 21.

When, during use, the optical device of the invention is coupled to the read-out instrumentation sketched in FIG. 21, the light of a laser beam coupled to the fiber is partially reflected at the fiber-to-air 156, air-to-cantilever 158, and cantilever-to-reflective layer 160 interfaces back into the fiber. The laser light is for instance infrared, having a 1.31 μm wavelength. The three reflected light signals enter a fiber coupler that transmits for instance 50% of the optical power to another fiber aligned with an infrared sensor. If multiple reflections are neglected, the output signal W of the detector, for instance a voltage, is given by equation (1):

$$W = W_1 + W_2 + W_3 - 2\sqrt{W_1 W_2} \cos\frac{4\pi d}{\lambda} - 2\sqrt{W_1 W_3} \cos\left(\frac{4\pi d}{\lambda} + \frac{4\pi nt}{\lambda}\right) + 2\sqrt{W_2 W_3} \cos\frac{4\pi nt}{\lambda}$$

where $W_1$, $W_2$, and $W_3$ are proportional to the amount of light reflected at the fiber-to-air, air-to-cantilever, and cantilever-to-metal interfaces, respectively, d is the separation in meter between the edge of the fiber and the inner surface of the cantilever, t is the thickness of the cantilever in meter, n is the refractive index of the core of the fiber, and λ is the wavelength of the laser in meter. Equation (1) can be rewritten as equation (2):

$$W = W_0\left(1 - V\cos\left(\frac{4\pi d}{\lambda} + \varphi\right)\right)$$

where φ is a constant, V is the fringe visibility, and $W_0$ is a midpoint output (FIG. 22). V and $W_0$ are related to the output signals corresponding to maximum ($W_{max}$) and minimum ($W_{min}$) interference according to the subsequent equations (3) and (4):

$$V = \frac{W_{max} - W_{min}}{W_{max} + W_{min}}$$

$$W_0 = \frac{W_{max} + W_{min}}{2}$$

The displacement sensitivity close to quadrature is given by equation (5):

$$\Delta d \approx \frac{\lambda}{4\pi} \frac{\Delta W}{W_0} \frac{1}{V}$$

where ΔW is the minimum detectable signal. Herein, quadrature means the situation wherein the output is equal to $W_0$, i.e. when the cosine of equation (2) is zero. The cosine of equation (2) is zero when the argument of the cosine is an odd multiple of π/2. Equation (5) is derived from equation (2) by making a Taylor series at quadrature.

FIG. 22 shows the read-out signal obtained in correspondence of a mechanical deformation of the cantilever, for instance while touching the cantilever with an external tip and pushing the free end of the cantilever in the direction of the fiber. The horizontal axis represents the time t, and the vertical axis represents the output W of the measurement device (in voltage V). At time t1, say about 800 ms after starting data acquisition, the cantilever is brought into contact with the end 20 of the optical fiber 12. The first spike in the trace corresponds to the approaching movement. The cantilever was then left in contact with the optical fiber for some time, for instance about 500 ms, as indicated by the flat part of the signal between the two spikes. At time t2, the tip was retracted, allowing the cantilever to return to its initial position. The returning cantilever produces the second spike of the trace (for instance after 1.5 s). The images below the trace represent the different positions in which the cantilever has been set: (i) freely suspended (before contact), (ii) in contact with the edge of the optical fiber, (iii) freely suspended (after contact).

This experiment demonstrates for instance that the device can be used as a position sensor. I.e., upon contact with a foreign body, the output signal of such a sensor changes. Upon retracting of the sensor, the output signal changes again, until arriving at the original output indicating that the contact with the foreign body is broken.

To determine the displacement sensitivity, the micromachined fiber was anchored to a heatable plate for determining the output signal as a function of the temperature of the plate. As the temperature increases, the stress induced by the different thermal expansion coefficients of the metallic coating and of the material of the optical fiber makes the cantilever bend. During this deformation the output signal passes through a minimum and a maximum, as expected from previous equations. In a practical embodiment, $W_{min}$ is about 3.1 V and $W_{max}$ is about 4.8 V. The RMS noise of the output signal, measured with a digital oscilloscope in the whole available bandwidth (dc-400 MHz) over a 0.2 s time interval, may be about 3.5 mV. The sensitivity that is achieved corresponds to a displacement of the cantilever relative to the fiber of about 0.4 nm. It is noted that the dominant part of the noise is associated to a high frequency periodic signal generated by the electronic read-out and not by the fiber itself.

The RMS noise value does not change if a standard cleaved optical fiber, i.e. an optical fiber lacking a cantilever, is plugged to the read-out system. By adding a high frequency filter at the exit of the read-out it is possible to reduce the noise level. The reduction may be down to a few hundreds of μV. The fringe visibility may be in the order of 21%. Improving the alignment of the cantilever with respect to the core of the fiber provides a higher visibility, which results in an improved sensitivity. The sensitivity may be superior to atomic level, for instance in the order of 0.4 to 0.2 Å.

Experiments have shown that practical embodiments of the present device have an accuracy that is comparable with the accuracy of commercially available AFMs. The device according to the invention obviates the need for any mechanical alignment.

Figure 23:
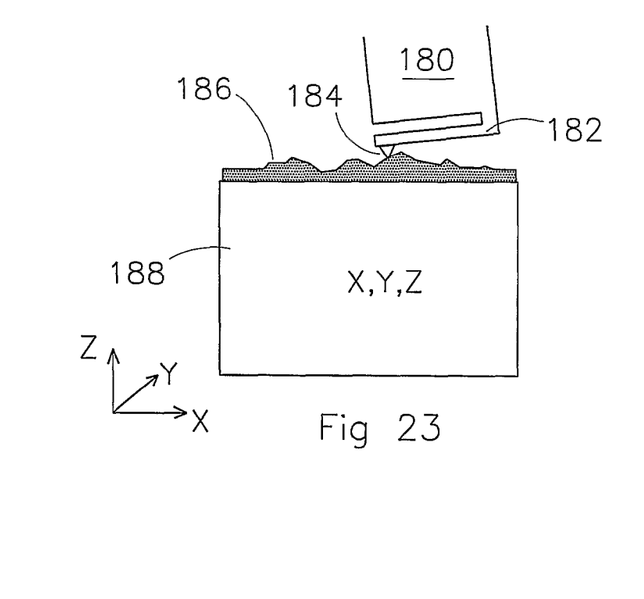
FIG. 23 shows a side view of an embodiment of the optical device according to the present invention during use.

An AFM comprising the optical device of the present invention is shown in FIG. 23. The optical device comprises optical fiber 180 with integrated cantilever 182. The free-hanging end of the cantilever is provided with an extending tip 184.

The tip of the cantilever is, during use, brought in close proximity with the surface 186 of a sample that is arranged on a measurement table 188. The table and/or the optical device are movable in x, y and z direction, as indicated in FIG. 23, to establish the desired close proximity of the tip to the surface. The stage 188 is for instance moveable by means of piezoelectric elements.

The tip 184 is brought into contact with the surface to be imaged, e.g. surface 186. When there is a relative movement between the tip and the surface in a horizontal plane, the cantilever carrying the tip bends according to the topography of the surface. Since the deformation of the cantilever can be measured as described above, the topography of the surface can be determined, i.e. measured. This technique is used in commercially available AFMs and is called contact mode.

The present device is suitable for measurements in critical environments. Applications beyond AFM experiments are also feasible. The optical device according to the invention could serve as or may be included in, for instance, a force transducer, electric or magnetic field sensor, humidity meter, accelerometer, vibration meter, temperature gauge, gas sensor, chemical sensor, biological sensor, particle detector, light sensor, et cetera.

Herein below, several of the above mentioned applications of the optical device of the present invention are described in more detail.

The device may be included in a force sensor. When a force is applied to the cantilever, the cantilever bends. For relatively small forces, the displacement of the cantilever is proportional to the force applied to the cantilever. Once the cantilever is calibrated, measurements of the displacement would give a direct measurement of the force. Alternatively, using the optical read-out system described above, one can measure the resonance frequency of the cantilever. When a force is applied, the resonance frequency changes. Measurements of the frequency shift would provide a direct measurement of the force applied. An application of this kind of sensor would be the measurement of surface forces. Surface forces include for instance Van der Waals forces, Casimir forces, double layer interactions, steric forces, salvation forces, hydration forces, depletion forces, jump to contact and pull-out forces, friction forces. For these applications, gluing or fabricating a microsphere to the free end of the cantilever may be useful.

The optical device of the invention may be included in a sensor for an electric or magnetic field. In this case, an object sensitive to an electric or magnetic field is glued or fabricated at (the free end of) the cantilever. For example, an electric field sensor could be obtained by putting an object with some free charges on its surface on the cantilever. When an electric field is applied, the presence of the charges makes the cantilever bent, allowing the user to detect the presence of an electric field. Similarly, a magnetic field sensor can be obtained by putting a microscopic magnet, or a microscopic spire with current flowing inside, on the free end of the cantilever.

The device of the invention can be included in an accelerometer. If the fiber is traveling at high speed and it comes to a sudden stop, moving parts, such as the cantilever, will tend to keep moving due to inertia. One should thus observe a sudden change in the position of the cantilever with respect to the fiber. Such accelerometer might be included in a car for the release of airbags upon impact. When the fiber undergoes acceleration or deceleration, the relative position of the cantilever with respect to the optical fiber changes, allowing the user to measure the acceleration or deceleration. In a similar way, the optical device of the invention can be used in gyroscopes. Similar devices could also be used as vibrometers.

The device of the present invention can be included in sensors for sensing for instance humidity, temperature, chemicals, products of biological or bacterial warfare, gasses. The cantilever can be coated with a material that undergoes mechanical stress upon absorption of the agent to be detected. A mechanical stress can be detected because it produces a change in the shape of the cantilever, which results in a change of the position of the cantilever with respect to the fiber. Alternatively, one can measure the resonance frequency of the cantilever. Examples include:

(1) Coating the cantilever with Palladium to make a Hydrogen sensor. Palladium absorbs Hydrogen very efficiently, and when it absorbs Hydrogen, it expands. When Hydrogen contacts the device, the expansion of Palladium will make the cantilever bent, an event that can be detected.

(2) The above described measurement of heating the fiber is a rudimental example of the use of the cantilever as a temperature sensor.

A bridge structure, as for instance shown in FIGS. 3A, 3B and 3C, can serve in chemical sensors for the detection of substances. Such chemical sensors may use a scattering effect, comparable to spectroscopy. In some applications, such as chemical sensors, it may be preferred to deposit the reflection layer on the side of the cantilever that faces towards the optical fiber instead of the opposite side.

The optical device of the invention can de used in dynamic mode as well when a vibration is provided to the cantilever by an external actuator, for instance a piezo-shaker. The resonance frequency of the cantilever is measured. When a force is applied to the cantilever, the resonance frequency shifts and/or the amplitude of the motion of the cantilever may change, for instance upon encountering surface topography. The shift of the resonance frequency and/or the change of the amplitude can be measured using the same interferometry technique as described above. A measurement of the resonance frequency allows the measurement of forces that are applied to the cantilever. This technique is referred to as a non-contact mode for surface imaging.

Another example is the adsorption or absorption of matter to the cantilever. Due to the adsorption or absorption, the mass of the cantilever changes and therefore the resonance frequency changes. This allows the measurement of adsorption or absorption of materials to the cantilever, and thus to make chemical or biological detectors.

In a practical embodiment, the spring constant of the cantilever may be in the order of 10 N/m. This value can be greatly varied by changing the dimensions of the cantilever or by choosing a different geometry of the device, compare for instance FIGS. 1-7. Optical fibers of different dimensions, shapes, or materials can be used as well.

The dimensions of a tested and correctly functioning cantilever according to the invention were, before the evaporation of the metallic reflection layer: length 112 µm, width 14 µm, and thickness 3.7 µm.

It is finally important to observe that the optical device can be used as an actuator. For instance, light pressure radiation could push the cantilever away from the fiber. Also, it is feasible to use anisotropic fibers that torque in response to angular momentum transfer of light. A bi-morph cantilever can also be fabricated. In this case, the heat produced by the laser light on the cantilever could serve to use the cantilever as an actuator.

Having and including, as used herein, are defined as comprising, i.e. open language.

The terms a or an, as used herein, are defined as one or more than one.

The term plurality, as used herein, is defined as two or more than two.

The term another, as used herein, is defined as at least a second or more.

The terms coupled, fixed and anchored, as used herein, are defined as connected, although not necessarily directly, and not necessarily mechanically.

The present invention is not limited to the above-described embodiments, wherein numerous modifications can be envisaged within the scope of the appended claims.

What is claimed is:

1. An optical device, comprising:
 an optical fiber; and
 a cantilever that is incorporated in an end of the optical fiber.

2. The optical device of claim 1, wherein the cantilever is an integral part of the optical fiber.

3. The optical device of claim 1, wherein the cantilever has a length that is substantially equal to a diameter of the optical fiber.

4. The optical device of claim 1, wherein measurement means for measuring a displacement of the cantilever are connected to an opposite end of the optical fiber.

5. The optical device of claim 4, wherein the measurement means comprise a laser.

6. The optical device of claim 4, wherein the measurement means include a high frequency filter.

7. The optical device of claim 1, wherein sensitivity of the optical device is below 4 Å.

8. The optical device of claim 1, wherein sensitivity of the optical device is in the order of 0.4 to 0.2 Å.

9. The optical device of claim 1, wherein the cantilever comprises glass and/or silica.

10. The optical device of claim 1, wherein the cantilever and/or the end of the optical fiber is coated with a reflection layer.

11. The optical device of claim 10, wherein the reflection layer comprises a metal.

12. The optical device of claim 11, wherein the metal comprises silver, gold or platinum.

13. The optical device of claim 10, wherein a thickness of the reflection layer is in the order of 100 nm.

14. The optical device according to claim 1, wherein the cantilever has two opposite ends, wherein one end is anchored to the optical fiber and the opposite end is free-ranging.

15. The optical device according to claim 1, wherein the cantilever comprises two opposite ends, wherein the two opposite ends are fixed to the optical fiber, and wherein a part of the cantilever between the two ends is freely suspended over the optical fiber.

16. The optical device according to claim 1, wherein the cantilever comprises a beam having a widened plate in the middle.

17. The optical device according to claim 1, wherein the cantilever is provided with at least one indentation.

18. A method of fabricating an optical device, comprising the steps of:
providing an optical fiber; and
arranging a cantilever in an end of the optical fiber.

19. The method of claim 18, comprising the further steps of:
cleaving the optical fiber;
coating the optical fiber with a metallic layer; and
machining the end of the optical fiber to obtain the cantilever as an integral part of the optical fiber.

20. The method of claim 19, comprising the step of depositing a metallic reflection layer on the end of the optical fiber and/or on the cantilever.

21. A method of measuring a displacement, the method comprising the steps of:
providing the optical device of claim 1;
arranging measurement means, comprising a light source, on an opposite end of the optical fiber;
using the light source to send a beam of light into the optical fiber;
measuring the interference of light that is reflected on the end of the optical fiber and light that is reflected on the cantilever; and
determining the displacement of the cantilever relative to an intermediate position dependent on the measured interference.

22. A method of analyzing a chemical structure of a substance, comprising:
providing a substance;
utilizing the optical device of claim 1 to determine the chemical structure of the substance by providing a sensitivity of the optical device which is superior to atomic level.

* * * * *